June 8, 1943. E. E. KELLEY 2,321,393
MACHINE TOOL
Filed Sept. 22, 1939 4 Sheets-Sheet 2
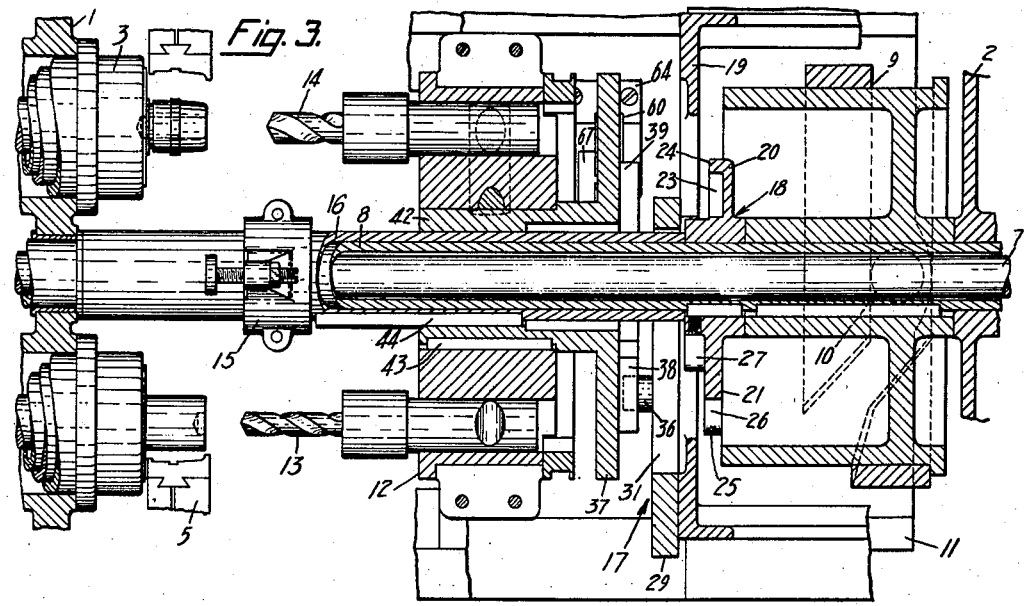
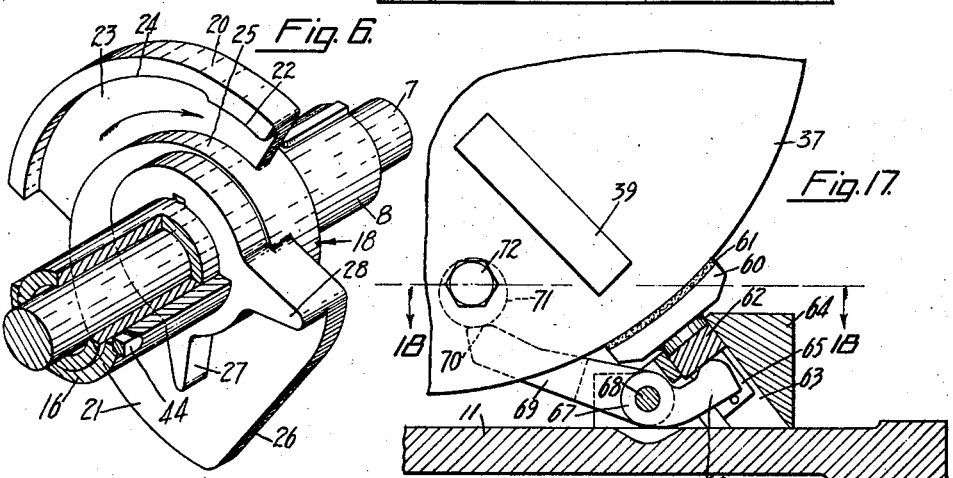
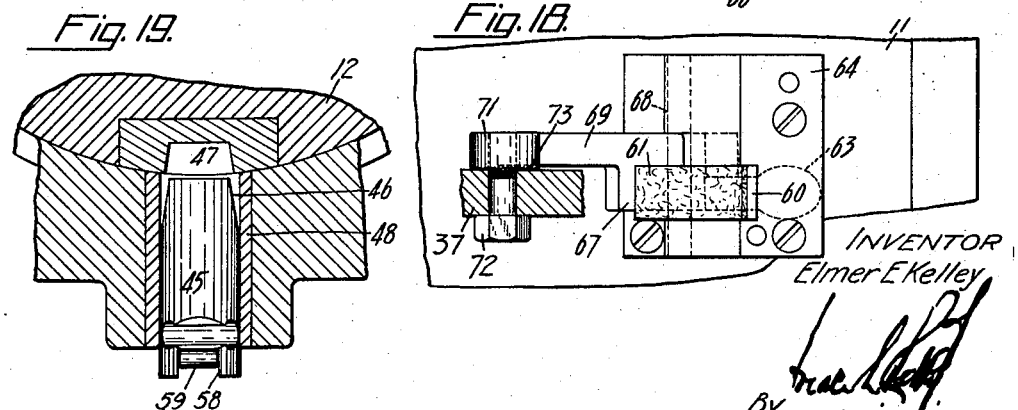
INVENTOR
Elmer E Kelley
By
ATTORNEY June 8, 1943.   E. E. KELLEY   2,321,393
MACHINE TOOL
Filed Sept. 22, 1939   4 Sheets-Sheet 3

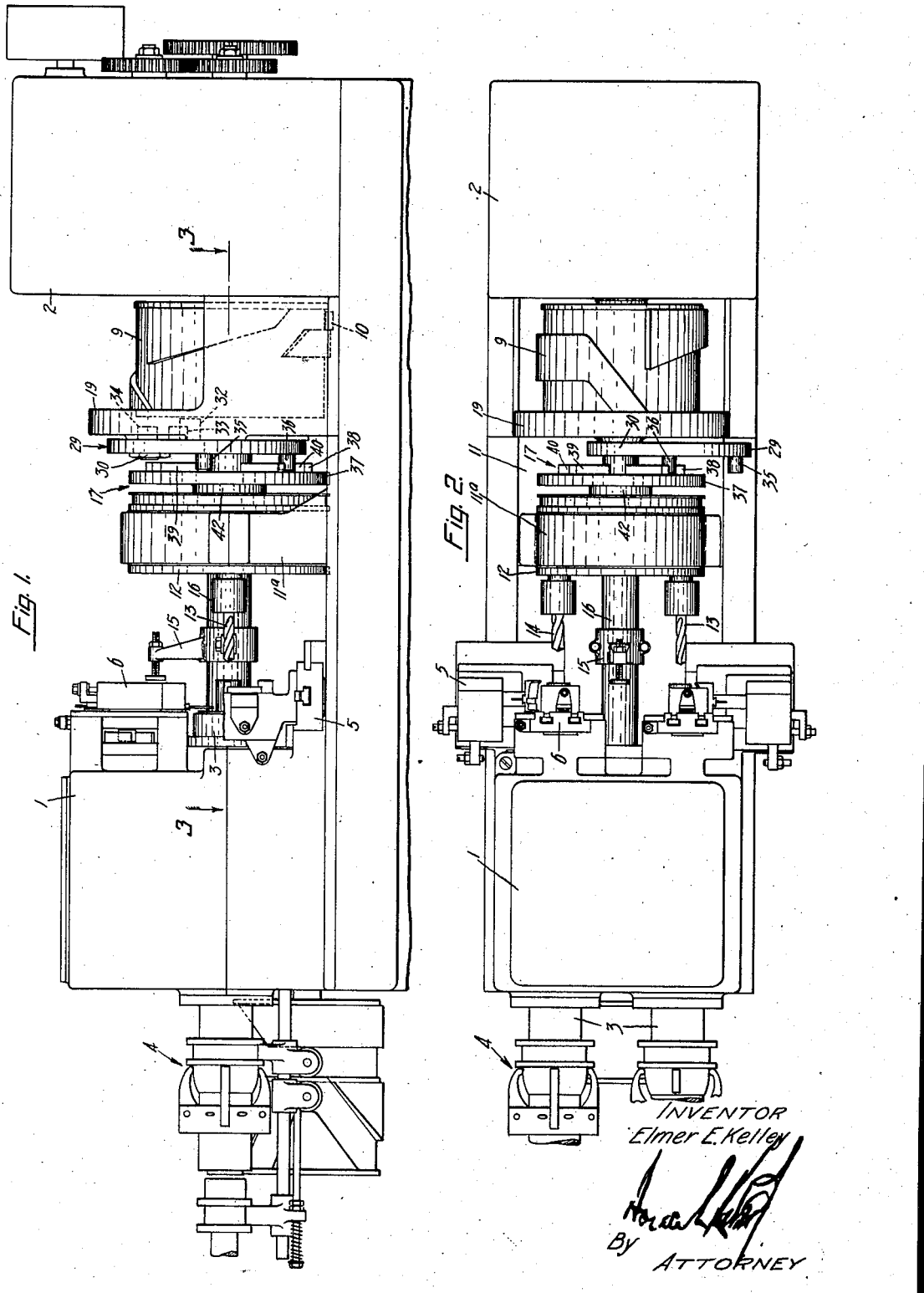

INVENTOR
Elmer E Kelley
By
ATTORNEY

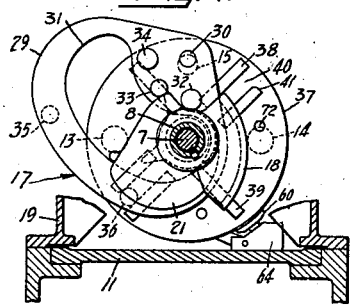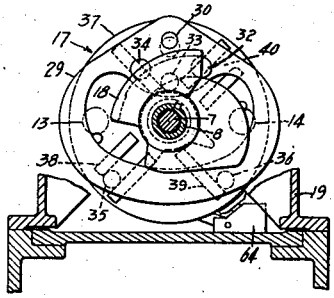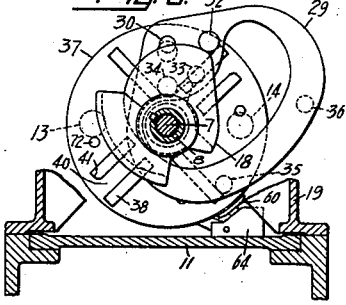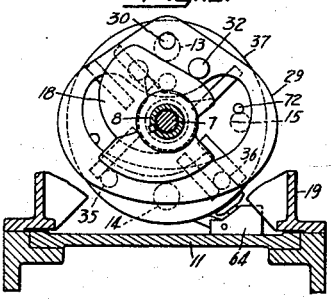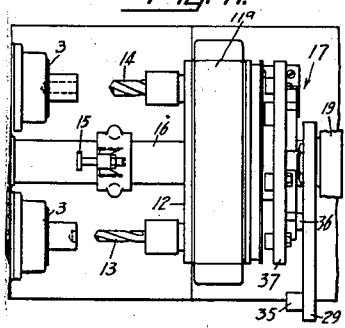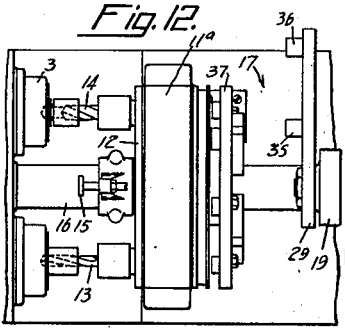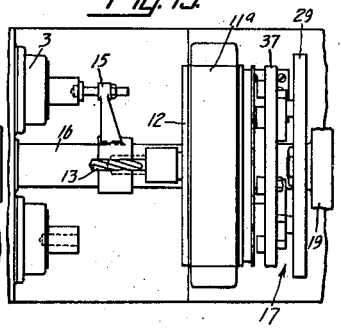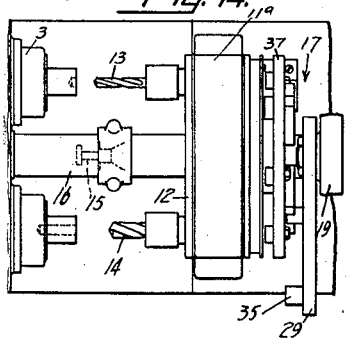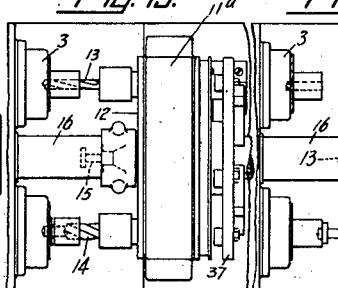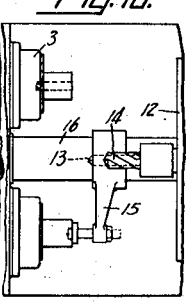

Patented June 8, 1943

2,321,393

UNITED STATES PATENT OFFICE 2,321,393

MACHINE TOOL

Elmer E. Kelley, Hartford, Conn.

Application September 22, 1939, Serial No. 296,105

21 Claims. (Cl. 29—43)

My invention relates to machine tools.

It has among its objects to provide an improved machine tool of the parallel spindle turret type described and claimed in my Patent No. 1,892,239, patented December 27, 1932, and, more particularly, to provide improved turret indexing mechanism therefor. A further object of my invention is to provide such an improved indexing mechanism wherein the turret is positively moved in an improved manner and the turret is also more accurately positioned in each position thereof. Another object of my invention is to provide improved operating mechanism for indexing the turret wherein, through an improved top pivotation of the turret actuating rocker member and improved cooperating actuating and controlling means for swinging said member about its pivot, the above results are obtained while eliminating all need for providing an additional weight on the rocker member or relying upon gravity, and while also insuring positive movement of the rocker member in either direction when disengaged from the turret actuating mechanism. Still further objects of my invention are to provide improved associated turret actuating cam and roller mechanism operating between the rocking member and cam disc and improved cooperating braking and positioning mechanisms for the turret cooperating with the latter and the cam disc respectively, whereby the movement of the turret is effected and controlled in an improved manner. Still another object of my invention is to provide improved actuating and positioning means for the stock stop arm in such manner as to make it possible to position the latter certainly and accurately in stopping positions intermediate the indexing positions of the turret wherein the latter is locked by the locking mechanism. These and other objects and advantages of my improved construction will, however, hereinafter more fully appear.

In the accompanying drawings, I have shown for purposes of illustration, one embodiment which my invention may assume in practice.

In these drawings:

Figure 1 is a side elevation of a machine tool equipped with my improvements;

Fig. 2 is a plan view of the same, certain parts being omitted to facilitate illustration;

Fig. 3 is an enlarged horizontal sectional view on line 3—3 of Figure 1;

Fig. 6 is a perspective view of the opposite side from that shown in Figure 5, of the indexing controlling and actuating cam;

Fig. 7 is a reduced detail sectional view on line 5—5 of Figure 4 but with certain parts omitted and the rocker bracket broken away to facilitate illustration;

Fig. 8 is a similar view showing the parts in Fig. 7 when the turret has moved forward and the rocker member is returning to its down position;

Fig. 9 is a similar view showing the parts with the turret ready for its initial 90° movement, the rocker member being then swung to the right;

Fig. 10 is a like view of the parts after the initial 90° movement, and while the stock is being fed and prior to the further 90° indexing movement which would reverse the tools before return of the parts to the position shown in Figure 7;

Fig. 11 is a reduced plan view showing the turret, tools and work when the indexing mechanism is in the position shown in Figure 7;

Fig. 12 is a like view showing these parts when the indexing mechanism is in the position shown in Figure 9, the tools then being advanced into the work;

Fig. 13 is a like view of the parts when the indexing mechanism is in the position shown in Figure 10, the stop arm then being in engagement with the stock in the right hand spindle and the tools being indexed through 90° as shown;

Fig. 14 is a view similar to Figure 11, but with the drills and stock stop arm reversed as they are following movement of the indexing mechanism from the position shown in Figure 10;

Fig. 15 shows the drills advanced into the work from the position shown in Figure 14;

Fig. 16 shows the stock stop in engagement with the work in the left hand spindle, the tools then being inoperative, as shown in Figure 13, but with the tools reversed from their position therein;

Fig. 17 is a detail view, partially in section, of the brake mechanism;

Fig. 18 is a section on line 18—18 of Figure 17, portions of the indexing disc being broken away to facilitate illustration, and Fig. 19 is a detail sectional view on line 19—19 of Fig. 4, showing the lock means.

Figure 5:
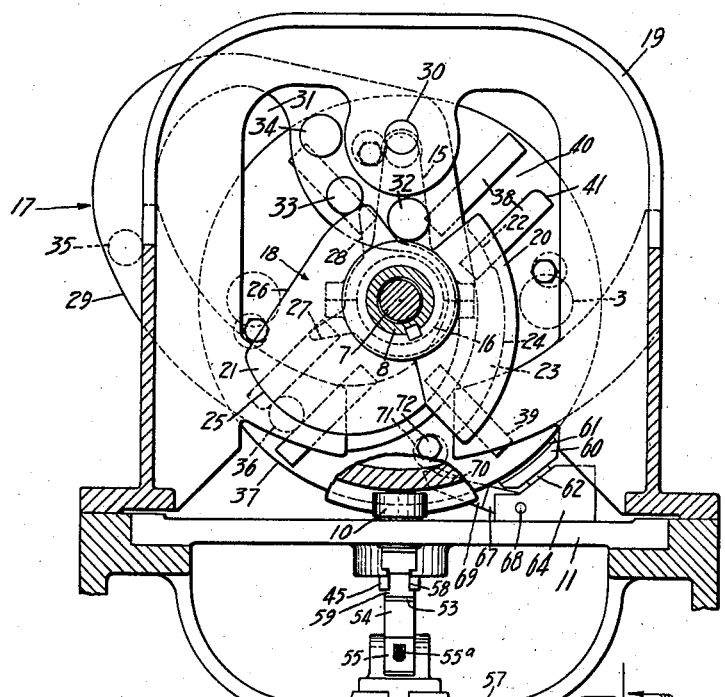
Fig. 5 is a transverse section on line 5—5 of Figure 4, the parts being shown in the position occupied when the turret has just indexed and is about to move forward to drill the stock, the rocker member then being in its uppermost position at the left.

In this illustrative construction, I have shown a machine of the general type described in my patent mentioned, and including a head stock 1 and a gear box 2, a plurality of parallel spindles 3 being carried in the head stock and suitably rotated by gearing therein, while the stock is fed therethrough, by feeding mechanism generally indicated at 4 and formed and cut off in the space between the head stock 1 and gear box 2. Herein, the head stock is also provided with a transverse bottom tool slide 5 and a plurality of vertical tool slides 6, both of which are operated in the desired sequence by gearing in the head stock. Power is also transmitted to the spindles 3 from a central shaft 7 and to the transverse and vertical tool slides 5 and 6, as well as to the feeding mechanism 4 by a sleeve 8 enclosing the shaft 7 and suitably driven through gearing within the gear box 2. Herein, also, a main cam 9 is provided coaxially on the sleeve 8 and rotatable therewith, and this cam is operatively connected through a cam follower or roller 10 with a longitudinal tool slide 11 which, in turn, carries a two part bracket 11a in which is journaled the turret 12 carrying any usual tools 13, 14; a stock stop arm 15 herein also being fixed to an outer sleeve 16 which extends axially through the turret and is indexed therewith. Herein, improved actuating and controlling mechanism, generally indicated at 17, is provided between the front end of the main cam 9 and the rear end of the turret 12 for operating and controlling the indexing of the turret 12 and the stock stop arm 15, all as hereinafter more specifically described.

This mechanism 17 includes an improved turret actuating cam, generally indicated at 18, and keyed to and rotatable with the sleeve 8. Herein, this cam 18 is disposed at the front end of the hub of the main cam 9, as shown in Figure 3, and within an end bracket 19. As shown in Fig. 6, this cam is of the multiple lobed type including a box cam portion 20 adapted to cooperate with an oppositely extending lobe portion 21. More particularly, the box cam portion 20 is provided with a guiding trough 22 and a communicating trough 23 of increased cross section and having an outer wall 24. Also, the lobe 21 is herein provided with a curved cam wall 25 disposed opposite and cooperating with the surfaces 22 and 24 to form a box cam, this wall 25 also extending around the cam 21 for approximately 180° and having its ends connected by a clearance cam portion 26. Herein, also, the cam portion 21 is provided on its hub with adjacent spaced cam teeth 27 and 28. Both of these cam teeth extend beyond the adjacent edge of the box cam 20 in such manner that they are thus adapted to cooperate with different and shorter rollers than would be required to engage the surfaces 22 and 25 of the box cam.

Cooperating with this improved cam is an improved rocker member, generally indicated at 29, which, as shown in Fig. 5, is pivoted at 30 centrally of its upper end in the bracket 19 and symmetrically disposed with respect to its pivot. As illustrated, this rocker member 29 is also provided with a cut-out portion 31 symmetrically disposed with respect to the body of the cam and to the pivot 30 and adapted to receive and permit movement of the rocker member 29 transversely relative to the adjacent end of the sleeve 16 at a point just in front of the hub of the cam 18. This rocker member also carries on the face thereof adjacent the cam 18, a plurality of rollers 32, 33 and 34, which are disposed above the cut-out portion 31 and around the pivot 30. Of these rollers, the roller 32 is a long roll adapted to be received between the box cam faces 22 and 25, the same cooperating with the surface 22 thereof and moving through the enlarged trough portion 23 while in contact with the cam surface 25 on the cam 21; attention here also being directed to the fact that this long roll 32 is shown as located slightly to the right of the center line of the rocker arm. The rolls 33 and 34, on the contrary, are short rolls adapted only to cooperate with the cam teeth 27 and 28 of the cam 21 and not of sufficient length to cooperate with the cam surfaces 22, 25 and 26. Of these rolls 33 and 34, it will also be noted that the roll 33 is located on the center line of the rocker member 29, and that the same is spaced between the rolls 32 and 34 and slightly nearer the roll 34. Here it will also be observed that the roll 33 is slightly smaller in diameter than the roll 34 which herein is illustrated as of substantially the same diameter as the long roll 32. On the opposite face of the rocker member 29, peripherally located rollers 35 and 36 are provided which are equally spaced on opposite sides of the center line of the member 29 and are adapted to cooperate with an improved cam disc 37.

This cam disc 37 herein is provided on its face adjacent the rollers 35 and 36, with a plurality of series of radial pads 38 and 39. As shown, these series are disposed on opposite sides of the axis of the disc. Also, in each series, a pair of pads 38 is disposed in parallelism adjacent each other to provide a passage 40 therebetween to receive the roller 36, attention being directed to the fact that the outer end 41 of one of these pads 38 is suitably rounded off to permit the roller 36 to enter the passage 40. The other pads 39 are disposed approximately at right angles to and between the pairs of pads 38 and are adapted to be engaged by the roll 35, as hereinafter described.

Attention is here directed to the fact that as shown in Fig. 3, the disc 37 is provided with an elongated hub 42 extending axially through the turret 12 and suitably keyed, as at 43, to the turret, while also being suitably keyed, as at 44, to the sleeve 16. Thus, the turret 12 being rotatably mounted in the bracket 11a, the turret is free to be indexed as the cam 18 rotates with the sleeve 8, rotation being imparted intermittently to the turret through the cooperation of the various cam surfaces and rollers hereinafter described. Further, the turret is also maintained free to move its tools 13 and 14 longitudinally, i. e. toward and from the work in the spindles 3, under the action of the main cam 9 which actuates the roller 10 carried on the longitudinal tool slide 11 which carries the turret in its bracket 11a; the cam disc 37 then being moved with the turret longitudinally relative to the rocker member 29, as also hereinafter described. It will further be evident that as the turret is thus moved longitudinally toward and from the work, it will slide reversely on the sleeve 16 which carries the stock stop arm 15, while the latter being keyed to the turret 12 is rotated therewith; conflict between the stock stop arm 15 and the tools being eliminated by the relative angular location of the stock stop arm with relation to the tools, the stock stop arm herein being disposed at an angle of 90° from either tool.

Operatively associated with the turret 12 is also improved turret positioning means. Herein, this mechanism, which is, as usual, carried on the bracket 11a, includes a positioning plunger 45 (Fig. 4) having an oppositely tapered end 46 adapted to be received in correspondingly shaped notches 47 spaced at 180° from each other around the periphery of the turret 12. Herein, the plunger 45 is carried in a suitable sleeve 48 slotted as at 49 to receive an operating arm 50 of a bell crank 51 pivoted on the slide 11 at 52 and having a depending tail cam 53. This tail cam 53 herein has a sloping bottom surface cooperating with the upper end of an upwardly projecting arm 54 on a bell crank 55 pivoted at 56 on a transverse member 57 fixed to the main frame of the machine. As shown, an adjusting screw 55a is also provided between the horizontal arm of this bell crank and the frame, in such manner as to vary the position, or setting, of the upper end of the arm 54 and, consequently, make possible a quite minute, or micrometer, adjustment controlling the time when the plunger 45 is withdrawn to unlock the turret. Attention here is also directed to the fact that the plunger 45 has a notch 58 therein receiving one end of a plate spring 59, the opposite end of which is fixed to the longitudinal slide 11. Thus, it will be observed that whenever the turret 12 is so rotated by the indexing mechanism above described, as, in either of two reverse positions, to bring its tools 13 and 14 into alignment with the work in the spindle 3, one of the notches 47 in the turret will be brought into registry with the tapered end 46 of the plunger 45, whereupon the spring 59 will cause the plunger to seat in the recess 48 and through the cooperating tapers on the seat and plunger will cause the tools to be brought into the exact positions desired. It will also be observed that the arm 54 is carried in a fixed position on the frame, the plunger 45 being automatically retracted when the turret has moved back to its retracted position and before any indexing movement thereof can occur.

Cooperating with this plunger mechanism and acting further to insure the proper positioning of the turret and stock stop arm 15, is also improved braking mechanism. Herein, this braking mechanism (Figs. 17 and 18) includes a brake shoe 60 disposed beneath the cam disc 37 and carrying a suitable brake lining 61 adapted to engage the periphery of the cam disc. Herein, this brake mechanism is located on the top of the slide 11 and under the cam disc 37. Further, improved means are provided for actuating the brake shoe 60, these means herein including an integral plunger 62 extending down into a suitable recess 63 in a block 64 carried on the slide 11. As shown, a longitudinal slot 65 is provided in this plunger 62, and adapted to receive an arm 66 of a bell crank 67 pivoted in the block 64 at 68 and also having a free arm 69 provided with a cam shaped nose 70 and extending inward beyond the periphery of the cam disc 37. Cooperating with the bell crank 67 and engaging the cam 70 thereon, is also improved means carried on the cam disc 37 on the side thereof adjacent the turret. These means herein comprise a plurality of eccentric adjustable cams 71 carried on clamping bolts 72 and having serrated surfaces 73 engageable with the adjacent face of the disc 37 in such manner as, when the bolts 72 are tightened, thereby to insure definite positioning of the adjusted cams relative to the cam nose 70. These cams 71 are herein four in number and equally spaced around the disc in such manner as to be adapted to engage the cam nose 70 of the bell crank 67 and, accordingly, actuate the latter and the plunger 62 to apply the brake in each of four indexing positions of the turret. Thus, as the turret rotates into any of its predetermined positions, the brake will slow up the same in such manner that the plunger 45 may have its tapered end 46 enter with certainty into the proper notch 47, while when the stock stop arm 15 occupies its intermediate positions, the brake will also act with sufficient force to cause this arm 15 to be maintained in the correct intermediate positions for stopping the stock. Obviously, through the adjustable cam members 71, the force exerted by the brake may also be increased as needed, to insure the stopping of the turret in the proper intermediate positions for the stock stop arm 15.

In the operation of a machine of this type, the spindles 3 will be rotated in a well known manner, while the tools on the bottom transverse tool slide 5 are operating on the work and while the vertical cut-off mechanism 6 is operating; the feeding mechanism 4 also thereafter feeding forward the stock rods in the spindles in a well known manner. In this type of machine, it will also be understood that as in my prior patent mentioned, the stock will be fed alternately through the different spindles by the feeding mechanism 4, the work pieces being also alternately formed and cut off by the tools on the transverse tool slide 5 and vertical cut off mechanism 6. Further, as in my prior construction mentioned, the turret 12 and stock stop arm 15 rotatable therewith, are indexed in such timed relation to the transverse tool slide 5, vertical cut-off mechanism 6 and feeding mechanism 4 as to cause the tools 13 and 14 to be fed longitudinally into the work in different spindles and then withdrawn and indexed to reverse these tools to enable them when again longitudinally advanced with the tool slide 11, to act upon the work in different spindles; the stock stop arm 15 also being indexed in such manner as alternately to provide a stop for the stock alternately fed, following cutting off, in different spindles 3 by this feeding mechanism 4.

Figure 4:
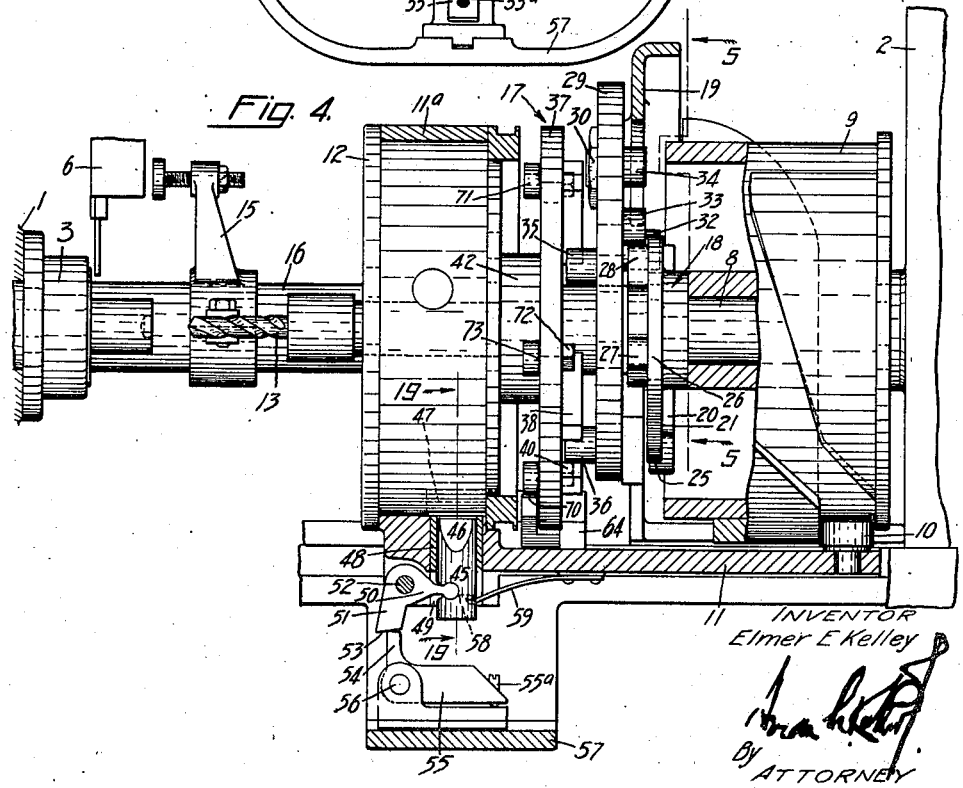
Fig. 4 is a side elevation partially in section of the mechanism shown in Fig. 3, certain parts being broken away to facilitate illustration.

More specifically considering the operation of my improved turret and stock stop indexing and controlling mechanism, reference is first made to Figures 1 to 5, inclusive, 7, 11, 17 and 18. In this position of the parts, as shown in Figure 11, it will be noted that the stock in the bottom spindle 3 has been fed and stopped by the stop arm 15, which has thereafter been moved to an upright position, while the small drill 13 is opposite the newly fed stock and the larger drill 14 is opposite the stock previously acted upon by the drill 13, and also previously formed by the tools on the transverse tool slide, as shown in Figure 3. It will be noted, however, that to facilitate illustration, the forming tools and the forming of the work thereby have been omitted from Figures 11 to 16, the particular shape of the work and the operation of the forming or other tools on the cross slide 5 not entering directly into the present invention which is concerned with the indexing mechanism. Also, in the position of the parts shown in Figures 1 to 5 inclusive, 7, 11, 17 and 18, the turret is ready to be moved forward to present these drills 13 and 14 to the work; while the rocking member 29 and cam disc 37 are in the position shown in Figures 7 and 11. Before more specifically considering the subsequent indexing operations, note further that the rocking member 29 in this position of the tools 13 and 14 is swung to its extreme left hand position, as shown in Figure 7, so that the drive shafts 7 and sleeves 8 and 16 are at the extreme right hand end of the cut-out portion 31 in this member 29. Further, one of the eccentric cams 71 has engaged the cam nose 70 of the bell crank 67 in such manner as to move the brake shoe 60 toward the periphery of the cam disc 37 and press the brake lining 61 against this periphery and thereby brake and hold the disc in such a position that the plunger 45 may enter the notch 47 in the turret 12. Consequently, when the cam 9 acts upon the follower 10 on the longitudinal tool slide 11 to move the turret 12 and tools 13 and 14 toward the work, the spring 59 will be free to project the plunger 45 into the notch 47 as soon as the tail cam 53 of the bell crank 51 clears the upwardly projecting arm 54 on the bell crank 55. Further, due to the oppositely tapered end 46 of the plunger 45 and the correspondingly tapered surfaces in the adjacent notch 47, the turret and the tools 13 and 14 rotatable therewith, will both be free to be accurately positioned angularly in such manner as to bring the tools into the desired exact alignment with the work in the spindles. However, this, what may be called angular adjusting or correction, movement of the tools cannot occur until the cam disc 37 has moved sufficiently longitudinally away from the rocking member 29 to cause the roller 36 on the rocking member to be freed from engagement with the opposite walls of the slot 40 between the parallel cam pads 38 (Figures 4, 5, and 7). During the entire longitudinal movement of the turret 12, longitudinal tool slide 11, and cam disc 37, it will be understood that the latter is thus entirely disconnected from the rocking member 29 as shown in Fig. 12. Thus, the member 29 when disconnected is free to be moved from the extreme left hand position, shown in Figure 7, to the extreme right hand position, shown in Figs. 9 and 12, by the associated cams 20 and 21 and roller 32. This movement is effected by the long roll 32 which, as the cam 18 rotates counterclockwise, enters between the cam surfaces 22 and 25, forming the box cam, and passes through the trough portion 23. During this movement, it will be evident that the surface 22 acts to prevent the rocking member 29 from falling by gravity, from the position shown in Figure 7 to the position shown in Figure 8. It will further be noted that in the intermediate position shown in Figure 8, the long roll 32 is emerging from the trough 23 and just about to engage the lifting portion of the surface 25 on the cam lobe 21. As a result, the rocking member 29 is lifted from the position shown in Figure 8 to its extreme right hand position shown in Figure 9. In this latter position of the rocking member 29, it will also be observed that its roll 35 is disposed at the right of one of the pads 39 on the cam disc 37, which at this time has just been moved reversely to its extreme retracted position with the longitudinal slide 11, following the completion of the drilling operation of the tools 13 and 14. At the same time that the cam disc 37 and the rocking member 29 are thus longitudinally reconnected for indexing, it will be observed that the rearward movement of the longitudinal tool slide 11 has caused the tail cam 53 of the bell crank 51 to engage the upwardly projecting arm 54 of the bell crank 55 and thereby operate that bell crank to pull down the plunger 45 and withdraw the same from the notch 47 in the turret, in such manner as to release the latter for indexing movement. It will further be understood that although, throughout the forward and reverse movements of the longitudinal tool slide 11, the brake lining 61 is maintained pressed against the cam disc 37 by the continued engagement of an eccentric 71 with the cam nose 70 of the bell crank 67, the brake will be automatically released as soon as the cam disc 37 begins to rotate again with the rocker member 29, this being due to the shape of the cam nose 70 which permits the eccentric cam 71 to pass readily off from the cam nose 70. Following this release of the brake and while the roller 35 is in contact with the pad 39, as shown in Figure 9, the cam tooth 27 is in engagement with the large short roll 34 on the rocking member 29. Accordingly, as the cam 18 continues to rotate counterclockwise, it will carry this roller 34 to the left from the position shown in Figure 9 to the position shown in Figure 10, in such manner as thereby to return the rocking member 29 from its extreme right hand position shown in Figure 9 to the position thereof shown in Figure 10. The disc 37 being rotatable by the rocking member 29 during this movement, due to the engagement of the roller 35 with the pad 39, the cam disc and the turret 12 will, accordingly, be moved through 90° to effect an indexing movement of the tools 13, 14 while the parts are moving from the positions shown in Figures 9 and 12 to those shown in Figures 10 and 13; the stock stop arm 15 also being moved into the position shown in Figs. 10 and 13 before the work is again fed by the feeding mechanism 4 and the roller 36 on the rocker member 29 during this movement also entering into the other slot 40 between the other set of pads 38. While the stock stop arm 15 is in the position shown in Fig. 13, sufficient dwell is also provided by the spacing of the toothed cam 28 from the small short roll 33, to enable the feeding mechanism 4 to release, feed and again grip the work before the stock stop 15 is moved out of the stopping position shown in Fig. 13. Attention here is also directed to the fact that, due to the small diameter of this roll 33, the latter has no engagement with that portion of the hub of the cam 18 between the toothed cams 27 and 28 and, accordingly, will not tend in any way to move the stock stop arm 15, while the latter arm is also held against movement by the action of the brake mechanism which is maintained applied by the engagement of one of the eccentric cams 71 with the cam nose 70. However, at the end of the dwell period, the toothed cam 28 engages this roll 33 and carries it to the left in such manner as thereby to swing the rocking member 29 from the position shown in Figure 10 to the position shown in Figure 7, the turret 12 with its tools 13 and 14 and the stock stop arm 15 then being indexed through a further 90° movement to bring the parts into the position shown in Figure 14, wherein both the drills and the stock stop are reversed with respect to their positions shown in Figures 7 and 11. Obviously, while the indexing mechanism is thus going through a half cycle of its operation, the upper work piece shown in Figure 11 will not only be completed, but cut off by the vertical cut-off mechanism 6, the same being cut off following the operation of the drill 14 thereon and between the positions of the parts shown in Figures 12 and 13, while a new length of stock will be fed, as shown in Figures 13 and 14, ready for forming, drilling and cutting off during the remaining half cycle of the indexing mechanism. Obviously, the movement of the parts in the second half of the cycle of the turret and indexing mechanism will be the same as that above described, and the turret will be braked and locked in its indexed position as before, the only difference being that at the beginning of this second half cycle, the tools 13 and 14 are reversed with respect to their position in Figure 11, and at the completion of the half cycle, are returned to the position shown in Figure 11, while the stock stop arm 15 is in depending position at the beginning of this half cycle and assumes the lower stock stopping position shown in Figure 16 during the cycle, and is returned to its upstanding stock stopping position shown in Figures 7 and 11 at the end of this second half cycle. Further, it will be understood that in the second half cycle, the lower work piece is the work piece which is formed, drilled and cut off, rather than the upper work piece which, as previously described, was similarly operated upon during the first half cycle. In connection with the second half cycle, it will also be understood that Figures 15 and 16 correspond to Figures 12 and 13, but that portions of the indexing mechanism have been omitted to facilitate illustration.

As a result of my improved construction, it will be observed that the rocking member 29 is not free at any time to be gravity operated, but, instead, is oppositely actuated and controlled by its associated cam mechanism, in such manner as to insure complete certainty and accuracy of operation. At the same time, all necessity for providing additional weights for effecting a swinging movement of this rocking member is eliminated, the latter, instead, being so pivoted at its top and positively moved by the cam mechanism as to make any such additional weight unnecessary. Attention is also directed to the improved accuracy of positioning, both of the turret and the stock stop arm, made possible by the improved braking mechanism, which eliminates any objectionable effects of inertia in the movement of the turret into the two index positions of the tools 13 and 14, and further acts to hold the turret in the two intermediate positions thereof, wherein the stock stop is disposed in opposite stock stopping positions opposite the ends of different spindles. It will also be observed that this braking mechanism facilitates the operation of the locking mechanism in bringing the moving turret to rest as the notch in the turret comes opposite the plunger of the locking mechanism, so that the plunger may consequently act more certainly and accurately to bring the tools into perfect alignment with the work. These and other advantages of my improved construction will, however, be clearly apparent to those skilled in the art.

While I have in this application specifically described one embodiment which my invention may assume in practice, it will be understood that this form of the same is chosen for purposes of illustration and that my invention may be modified and embodied in various other forms without departing from its spirit or the scope of the appended claims.

What I claim as new and desire to secure by Letters Patent is:

1. In a machine tool of the type having stock rotating and feeding mechanisms including a rotating spindle, tool slide mechanism carrying tools operating on work in said spindle, driving shafts for said mechanisms, longitudinally reciprocable carrier mechanism including a rotatable turret actuated from one of said drive shafts and carrying a plurality of tools for operating on said work, and means for indexing said turret to present different tools to said work, turret braking mechanism for braking said turret as it approaches the end of an indexing operation including a brake carried on and longitudinally reciprocable with said carrier mechanism and brake controlling means spaced around the axis of and rotatable with said turret.

2. In a machine tool of the type having stock rotating and feeding mechanisms including a rotating spindle, tool slide mechanism carrying tools operating on work in said spindle, driving shafts for said mechanisms, longitudinally reciprocable carrier mechanism including a turret actuated from one of said drive shafts and carrying a plurality of tools for operating on said work, and means for indexing said turret to present different tools to said work, turret braking mechanism for braking said turret as it approaches the end of an indexing operation including a brake member carried on and longitudinally reciprocable with said carrier mechanism for braking an element of said indexing means, and a plurality of spaced cams on said element for applying and releasing said brake member.

3. In a machine tool of the type having stock rotating and feeding mechanisms including a rotating spindle, tool slide mechanisms carrying tools operating on work in said spindle, driving shafts for said mechanisms, longitudinally reciprocable carrier mechanism including a turret actuated from one of said drive shafts and carrying a plurality of tools for operating on said work, and means for indexing said turret to present different tools to said work, turret braking mechanism carried on said carrier mechanism, and means spaced around the axis of said turret for applying said braking mechanism as the turret approaches the end of an indexing operation and maintaining the turret braked during the operation of said longitudinal carrier mechanism.

4. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings in one direction about its pivot.

5. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings in one direction about its pivot, said rocking member being pivoted at its top and having a plurality of rollers adjacent its pivot cooperating with said cam.

6. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings about its pivot, said cam including a box portion, an oppositely disposed lobe, and a plurality of spaced cam teeth, and said rocking member carrying different rollers cooperating with said box portion and lobe and with said cam teeth.

7. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings about its pivot, said cam including a box portion, an oppositely disposed lobe, and a plurality of spaced cam teeth, and said rocking member carrying different rollers cooperating with said box portion and lobe and with said cam teeth, said cam teeth being offset in different planes from said box cam and lobe and said different rollers being of different length to cooperate therewith.

8. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings about its pivot, including on said disc a plurality of angularly related pads, and rollers on said rocking member selectively cooperating with said pads.

9. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings about its pivot, including on said disc a plurality of angularly related pads, and rollers on said rocking member selectively cooperating with said pads, said pads including parallel spaced pads and an angularly related single pad.

10. In a machine tool, turret indexing mechanism including a longitudinally reciprocable and rotatably mounted turret, a cam disc fixed to said turret, a rocking member pivoted on a stationary part of the machine, an indexing cam positively rocking said member in both directions, and cooperating longitudinally separable elements between said disc and rocking member for positively indexing said cam disc and turret as said rocking member swings about its pivot, including on said disc a plurality of angularly related pads, and rollers on said rocking member selectively cooperating with said pads, said rocking member being pivoted at its top and having said rollers spaced from one another along its periphery remote from said pivot.

11. In a machine tool, of the type having stock rotating and feeding mechanisms including a rotating spindle, tool carrier mechanism carrying tools operating on work in said spindle, driving shafts for said mechanisms, longitudinally reciprocable carrier mechanism including a turret actuated from one of said drive shafts and carrying a plurality of tools for operating on said work and a stock stop member, means for indexing said turret to present different tools to said work in different turret positions and to move said stock stop into and out of operative position intermediate said positions, and means for locking said turret against rotation only in the different operative positions of said tools, braking mechanism for holding said turret in said intermediate stock stop positions.

12. In a machine tool of the type having stock rotating and feeding mechanisms including a rotating spindle, tool slide mechanism carrying tools operating on work in said spindle, driving shafts for said mechanisms, longitudinally reciprocable carrier mechanism including a turret actuated from one of said drive shafts and carrying a plurality of tools for operating on said work and a stock stop member, means for indexing said turret to present different tools to said work in different turret positions and to move said stock stop into and out of operative position intermediate said positions, and means for locking said turret against rotation only in the different operative positions of said tools, braking mechanism for holding said turret in said intermediate stock stop positions and braking the turret movement as it approaches the locked positions thereof.

13. In a machine tool of the type having stock rotating and feeding mechanisms including a rotating spindle, tool carrier mechanism carrying tools operating on work in said spindle, driving shafts for said mechanisms, longitudinally reciprocable carrier mechanism including a turret actuated from one of said drive shafts and carrying a plurality of tools for operating on said work and a stock stop member, means for indexing said turret to present different tools to said work in different turret positions and to move said stock stop into and out of operative position intermediate said positions, and means for locking said turret against rotation only in the different operative positions of said tools, braking mechanism for holding said turret in said intermediate stock stop positions and braking the turret movement as it approaches the locked positions thereof, including a brake mechanism and a plurality of brake controlling members corresponding to said tool and stock stop positions and rotatable with said turret.

14. In a machine tool of the type having stock rotating and feeding mechanisms including a rotating spindle, tool carrier mechanism carrying tools operating on work in said spindle, driving shafts for said mechanisms, longitudinally reciprocable carrier mechanism including a turret actuated from one of said drive shafts and carrying a plurality of tools for operating on said work and a stock stop member, means for indexing said turret to present different tools to said work in different turret positions and to move said stock stop into and out of operative position intermediate said positions, and means for locking said turret against rotation only in the different operative positions of said tools, braking mechanism for holding said turret in said intermediate stock stop positions and braking the turret movement as it approaches the locked positions thereof, including a brake mechanism and a plurality of brake controlling members corresponding to said tool and stock stop positions and rotatable with said turret, the controlling members for the stock stop being alternately disposed between other members acting to apply the brake as the turret approaches locking position.

15. In a machine tool, indexing mechanism including a rotating turret, brake mechanism operative on said turret and having a brake applying lever, and cam means on said turret spaced about the axis of the latter and actuating said lever to apply and release said brake as said turret rotates.

16. In a machine tool, indexing mechanism including a rotating turret, brake mechanism operative on said turret and having a brake applying lever, and cam means on said turret and spaced about the axis of the latter and actuating said lever to apply and release said brake, said cam means comprising a plurality of spaced adjustable eccentric cams each adjustable about one of a plurality of axes spaced around the turret axis.

17. In a machine tool, indexing mechanism including a rotating turret, brake mechanism operative on a part of said mechanism rotating with said turret and having a brake applying lever, and cam means on a part rotatable with said turret and about the axis of the latter and actuating said lever to apply and release said brake, said brake lever having a cam nose engageable by said rotating cam to apply the brake and initially fully applying said brake, and also having an adjacent cam face engaging said rotatable cam member to maintain said brake applied and permit release upon resumption of rotation of the turret.

18. In a machine tool, indexing mechanism including a longitudinally reciprocable tool carrier and a rotatable tool carrying turret thereon, locking mechanism including notches rotatable with said turret and a cooperating plunger carried by said tool carrier and biased into locking position, and cooperating plunger controlling means carried on said tool carrier and a stationary part of the machine for withdrawing said plunger and holding it withdrawn during indexing of said turret to the next locking position thereof, including a plunger operating bell crank movable with said plunger and a cooperating bell crank carried by said stationary part and having one of its arms adjustable relative to said stationary part and having its other arm comprising an upstanding abutment engageable by one arm of said first mentioned bell crank at the end of movement of said carrier in one direction and remaining in engagement therewith to hold said plunger in withdrawn position during movement of the turret to its next position and until said tool carrier has moved a predetermined distance in the opposite direction.

19. In a machine tool of the type having indexing mechanism including a longitudinally reciprocable tool carrier and a rotatable tool carrying turret thereon, locking mechanism including notches rotatable with said turret and a cooperating plunger carried by said tool carrier and biased into locking position, cooperating plunger controlling means carried on said tool carrier and a stationary part of the machine and operated by movement of said carrier for withdrawing said plunger and holding it withdrawn during indexing of said turret to the next locking position thereof and for releasing said plunger only when said carrier has moved a predetermined distance following indexing, and braking mechanism braking said turret as it approaches locking position, said plunger being released and locking said turret upon a predetermined forward movement of the longitudinal tool carrier while said brake is maintained in braking position.

20. In a machine tool of the type having a head stock carrying a plurality of parallel spindles and associated stock feeding mechanism, tool slide mechanism on said head stock carrying tools operating on work in said spindles to form and cut-off alternately the work in different spindles, driving shafting operating said spindles, feeding mechanism and tool slide mechanism including a power shaft, a longitudinal tool slide, and a main cam actuated by said power shaft and operating said tool slide, a turret rotatable on said tool slide and carrying a plurality of tools for cooperating with the work in said spindles, said longitudinal tool slide being reciprocably mounted beneath said main cam, and said turret being disposed substantially in the longitudinal planes of said cam and on the opposite side of said cam from the source of power for said power shaft, indexing mechanism between said main cam and turret and including an operating member rotatable with one of said shafts for indexing the turret tools into reverse operative positions with respect to the work in said spindles, a stock stop mounted coaxially with said shafting and rotatable with said turret and movable into positions to stop the stock in different spindles between the reverse operative positions of the tools carried by said turret, mechanism for locking said turret in the reverse position thereof, and braking mechanism for braking said turret as it approaches each locking position thereof and in the operative positions of said stock stop.

21. In a machine tool of the type having a head stock carrying a plurality of parallel spindles and associated stock feeding mechanism, tool slide mechanism on said head stock carrying tools operating on work in said spindles to form and cut-off alternately the work in different spindles, driving shafting operating said spindles, feeding mechanism and tool slide mechanism including a power shaft, a longitudinal tool slide, and a main cam actuated by said power shaft and operating said tool slide, a turret rotatable on said tool slide and carrying a plurality of tools for cooperating with the work in said spindles, said longitudinal tool slide being reciprocably mounted beneath said main cam, and said turret being disposed substantially in the longitudinal planes of said cam and on the opposite side of said cam from the source of power for said power shaft, indexing mechanism between said main cam and turret and including an operating member rotatable with one of said shafts for indexing the turret tools into reverse operative positions with respect to the work in said spindles, a stock stop mounted coaxially with said shafting and rotatable with said turret and movable into positions to stop the stock in different spindles between the reverse operative positions of the tools carried by said turret, mechanism for locking said turret in the reverse position thereof, and braking mechanism for braking said turret as it approaches each locking position thereof and in the operative positions of said stock stop, said braking mechanism also being maintained operative during the longitudinal movements of said longitudinal tool slide and automatically released upon rotation of said turret.

ELMER E. KELLEY.